Jan. 12, 1932.  W. H. DUGGAN  1,840,492
CONTAINER AND HANDLE MEANS
Filed April 2, 1928  3 Sheets-Sheet 1
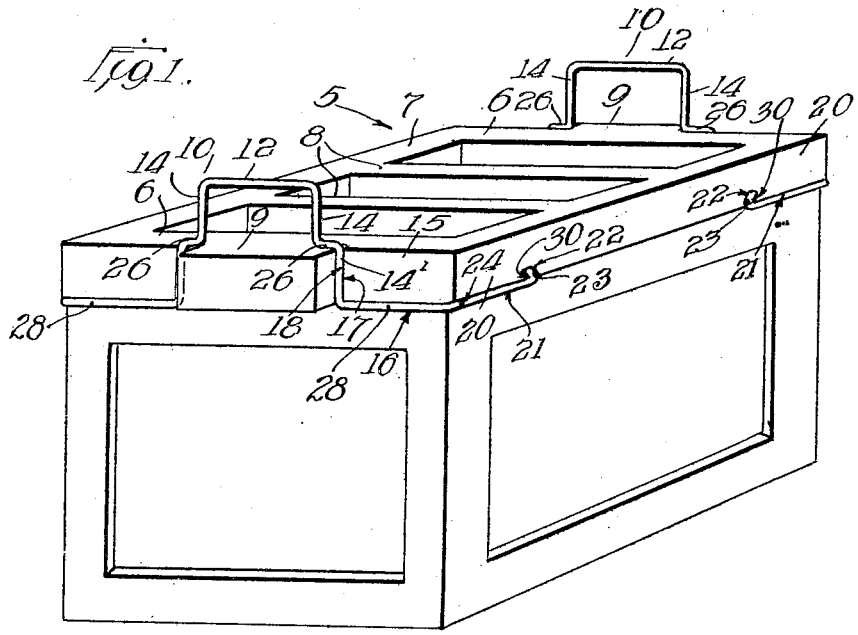
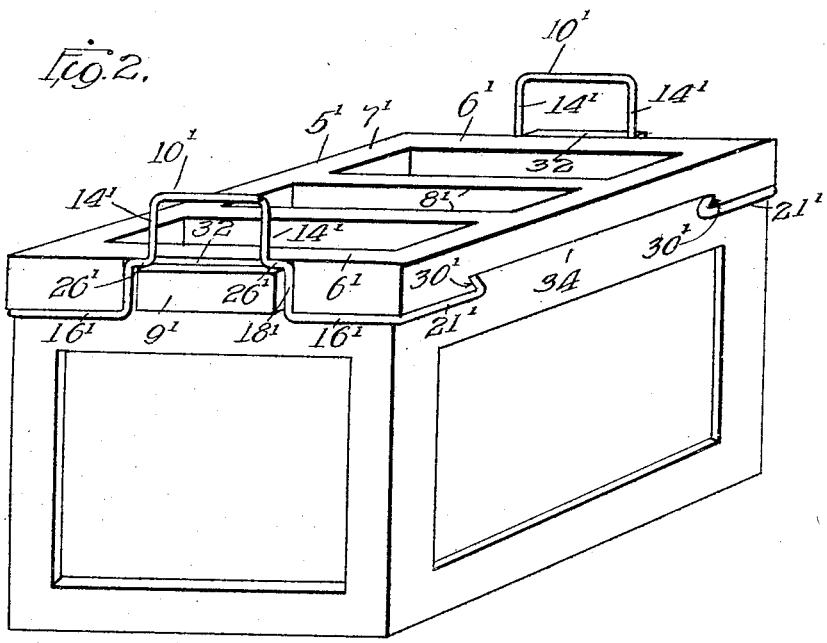
Witness:
Harry R. White
Inventor
William H. Duggan
By Brown, Jackson, Boettcher & Dienner
Attys Jan. 12, 1932.     W. H. DUGGAN     1,840,492

CONTAINER AND HANDLE MEANS

Filed April 2, 1928     3 Sheets-Sheet 2

Witness:
Harry R. L. White

Inventor
William H. Duggan
By Brown, Jackson, Boettcher & Dienner
Attys

Jan. 12, 1932.  W. H. DUGGAN  1,840,492
CONTAINER AND HANDLE MEANS
Filed April 2, 1928    3 Sheets-Sheet 3
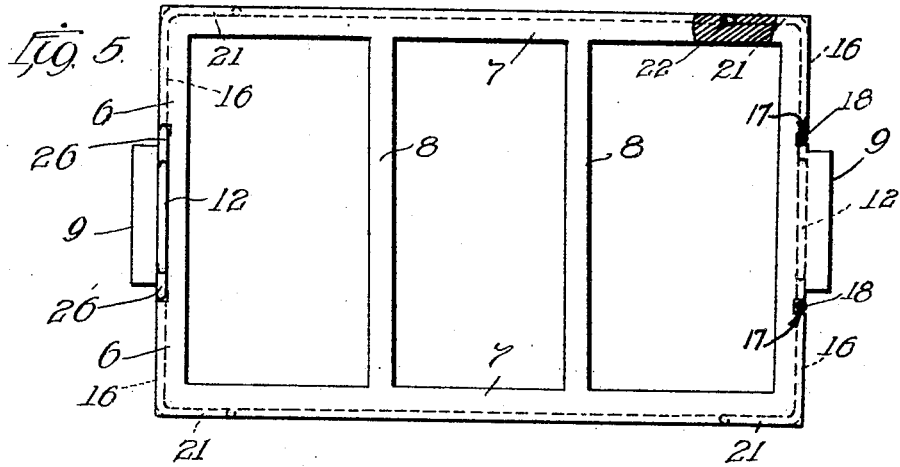
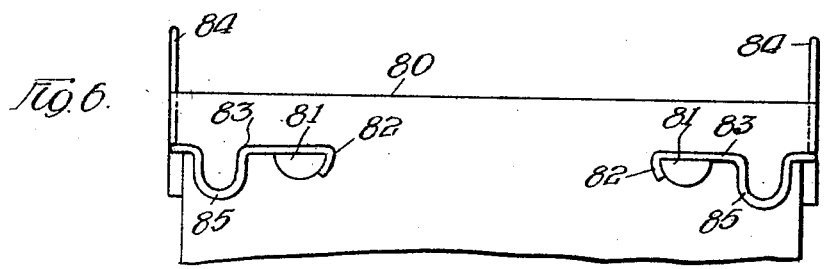
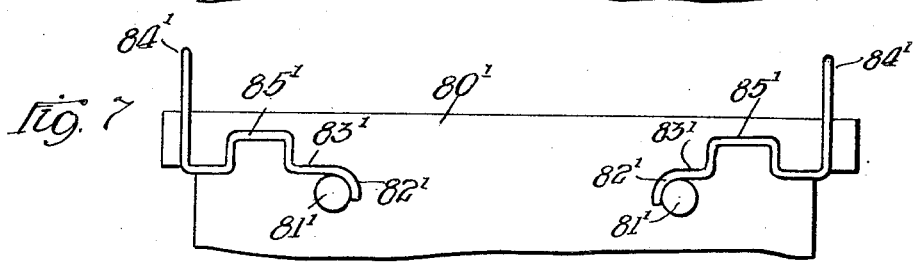
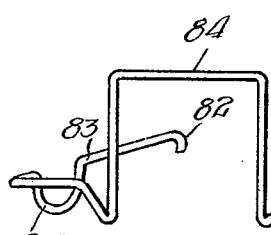
Witness:
Harry R. L. White
Inventor
William H. Duggan
By Brown, Jackson, Boettcher & Dienner Patented Jan. 12, 1932

1,840,492

UNITED STATES PATENT OFFICE

WILLIAM H. DUGGAN, OF CHICAGO, ILLINOIS, ASSIGNOR, BY DIRECT AND MESNE ASSIGNMENTS, OF FOUR-TENTHS TO BENJAMIN CLARKE, ONE-TENTH TO C. W. CLARKE, AND ONE-TENTH TO FRANK M. CLARKE, ALL OF CHICAGO, ILLINOIS

CONTAINER AND HANDLE MEANS

Application filed April 2, 1928. Serial No. 266,522.

This invention relates to container and handle means for storage batteries and the like, and its object is to provide a container, and particularly a storage battery container with integral molded handle means or lifting lugs in combination with an auxiliary handle and means on the container for receiving and retaining the auxiliary handle means.

Formerly the containers for storage batteries for motor vehicle, radio and other uses consisted of a wooden box in which individual acid resisting composition, rubber or glass jars were used to house the cells of the battery. More recently, all of the container and individual jar structure has been embodied in a unitary structure usually of molded composition.

These unitary molded containers are now being marketed with integral molded handles on the opposite ends and in some instances, for example, for some radio uses and for some types of automobile battery hangers, are preferred in this form. These moulded handles are not suitable for lifting a battery container from an automobile hanger and batteries with such handles are now commonly lifted from the car by engaging pliers with the battery connections. This frequently loosens the sealing compound which has caused considerable trouble. In addition, in a large number of instances, these moulded handles are not suitable or desired, particularly in connection with some of the automobile battery hangers and battery hold-down provisions now in use.

The conflicting requirements of different hanger and hold-down arrangements have made it necessary for battery manufacturers to produce different battery containers or different forms of handle means to suit these different requirements. This diversifies and objectionably increases manufacturing and sales cost. The handles for use where moulded handles are not suitable have usually required the insertion of rivets, screws, bolts or the like, or the use of nuts or other fastening means in attaching same to the container. The action of sulphuric acid solutions upon metal joints and metal parts is well known, and the metal handles have usually placed a rather difficult task upon the person arranging the device upon the battery and especially where several points of connection about the band or strip are required the device becomes expensive and in distribution a number of different parts must be furnished.

In my prior Patent No. 1,591,811, of July 6, 1926, I have reduced the objections to the previous handle bands, and in my prior Patent No. 1,573,922, of February 23, 1926, I have provided handle means for spreading over the top of the case or over shoulder means thereon and held in place by suitable shoulder means and by squeezing tension of the handle means.

According to my present invention, I make it possible for the battery manufacturer to produce a standard battery that will fit all automobile battery hangers and which will be adapted for radio and other uses. I provide a container that can be made and marketed with the unitary or lug type handles, molded or otherwise formed on the container as a unitary part thereof, and I provide means for securing auxiliary handle means as well as auxiliary handle means that may be readily attached to the container either before or after the battery is put in use. In this manner the construction of the container is standardized and the cost reduced, and this same standardized container may be quickly and conveniently adapted to other requirements, as, for example, to a hanger and hold-down arrangement to which the battery with the molded handle means is not adapted.

The auxiliary handle means is easy to make and is relatively inexpensive and may be distributed independently of the battery manufacturer or battery dealer and applied without tools.

This auxiliary handle means may also be readily applied or replaced by the layman. The auxiliary handle means may be used or applied for lifting the battery from the hanger without pushing the battery up out of the hanger or grasping the metal parts or connections at the top of the battery to lift the same out of the hanger The invention is illustrated in the accompanying drawings, in which:—

Fig. 1 is an isometric view of a battery container and handle arrangement embodying the present invention;

Fig. 2 is a view similar to Fig. 1 of another embodiment of the invention;

Figs. 3 and 4 are isometric views similar to Figs. 1 and 2 of still further embodiments of the invention;

Fig. 5 is a top plan view of the container and handle arrangement of Fig. 1 showing a small portion of one of the side walls broken away and in section;

Fig. 6 is a fragmentary side elevational view showing another form of engagement between the auxiliary handle means and the sides of the container;

Fig. 7 is a fragmentary side elevational view similar to Fig. 6 showing still another form of engagement between the handle means and the sides of the container; and Fig. 8 is an isometric view of one of the handle devices shown in Fig. 6.

Referring first to Fig. 1, the battery container or case 5 has end walls 6, side walls 7, and dividing partitions 8, all molded or otherwise formed into an integral unitary structure, as, for example, of a suitable acid resisting composition well known in the art. The battery plates (not shown) are installed in the compartments provided by the partitions 8 and their terminals may be connected as well known in the art.

The integral or molded handle means is shown as comprising a molded handle projection 9 on each of the opposite ends 6 of the container 5. These molded handles 9 are shown as projecting outwardly from the upper margins of the outer surfaces of the end walls 6 substantially centrally between the opposite sides of the container. The width of each molded handle 9, which is preferably molded as an integral unit with the container 5 may be as shown or varied, as desired, and the depth may be generally as shown, or otherwise, as desired, to provide the required strength and, at the same time, to permit the fingers to be engaged beneath the bottom surfaces of the handle lugs 9 for lifting or handling the container.

These molded handles 9 are frequently suitable for radio use and, as already pointed out, said molded handles 9 are adapted for use with some types of automobile battery hangers. There are, however, other battery hangers and hold-down arrangements now in use with which these molded handles 9 cannot be employed.

Even where they can be employed, the space is frequently restricted and, in lifting a battery having these molded handles only from the car, it has become common to push the battery up out of the hanger or to grasp the metal connectors with pliers or the like with the disadvantages already pointed out.

Therefore, to accommodate this same battery container 5 with its molded handles 9 to battery hangers and hold-down arrangements with which the molded handles 9 are not adapted for use, I provide the auxiliary handles 10. Each auxiliary handle 10 is preferably formed of a wire or rod of circular section, or of other suitable metal stock, which may have some inherent springiness, although this is not required, and the stock of each handle 10 may be relatively rigid, so far as the present invention is concerned. Each handle 10 has, between its ends, an upwardly extending bight or handle loop 12. While the sides 14 of the bight or handle loop 12 may be spread if desired, this spreading is not necessary in connection with the present invention, and these sides 14 may be, and are, preferably substantially parallel vertically, as shown.

For the purpose of retaining and holding the auxiliary handles 10 upon the container 5 and for lifting the container 5 therewith, I provide the upper margins of the outer surfaces of the end walls 6 with integral projections or thickened margins 15 which form bottom shoulders or ledges 16 and vertical shoulders 17 parallel with the opposite sides of the molded handles 9 and spaced therefrom to form the vertical grooves 18 for receiving the lower portions 14' of the side walls of the handle loop or bight. I also provide the side walls 7 with integral shoulders or thickened margins 20 which form bottom shoulders or ledges 21 and which may extend longitudinally along the upper margin of the side wall from end to end, as shown, with notches 22 for receiving the upturned ends 23 of the inturned sides 24 of the handles 10. It is to be understood, of course, that the side shoulders 20 need not extend over the entire length of the side wall of the container, but may be formed at the ends only to provide the bottom shoulders or ledges 21 and suitable vertical shoulders for cooperation with the upturned ends 23 in the manner of the notches 22.

The upright or vertical side walls of the handle loops 12 are offset between the upper and lower side wall portions 14 and 14' to form inturned horizontal portions 26 which overlie and engage the upper surfaces or shoulders provided by the molded handles 9.

The connecting portions 28 of the auxiliary handles 10 engage beneath the ledges or downwardly facing shoulders 16 along the ends of the container 5 and the side portions 14' engage in the grooves 18, the upright shoulders 17 being preferably positioned relatively close to the upright handle portions 14' so that when a hold-down device is engaged with the handle loop 12, the shoulders 17 will contact with the lower side portions 14' of the handle loops and prevent spreading. The downward engagement of horizontal portions 26 with the upper surfaces of the molded handles takes the downwardly directed hold-down stresses and may be employed alone or with shoulders 17 to prevent spreading of the handle loop. The auxiliary handles 10 may be applied without spreading by introducing the sides 24 of the handle over the sides of the container from one end to engage the loop portions 14' in the grooves 18 and the horizontal portions 26 with the upper surfaces of the molded handles 9 and then springing or hooking the upturned ends 23 to the notches 22. Obviously, the molded projections 9 form the molded handles of the container and, in addition, form the upwardly facing shoulder means for the auxiliary handles 10 and the auxiliary handles may be applied and removed without spreading over the top of the container as well as without spreading over other shoulder means and without spreading tools or the like. In order to remove the auxiliary handles, it is simply necessary to unhook the upturned ends 23 from the notches 22 and then remove these handles endwise from the container. The notches 22 are preferably obliquely returned slightly as shown, although this may be varied.

Obviously, instead of the vertical shoulders or lengthwise retention 30 provided thereby, the upturned ends 22 may be connected by a loop wire connection for holding the auxiliary handles longitudinally in place. The upright shoulders 17 may fit relatively closely to the upright portions 14' of the handle loops because of the absence of any spreading action in applying the auxiliary handle means, and with this provision the upright spreading of the handle loops may be omitted, as shown.

The embodiment of Fig. 2 is substantially the same as the embodiment of Fig. 1 with the exception that the upper surfaces of the molded handles 9' are stepped or set down at 32 from the upper surface of the container sufficiently to receive the horizontal portions 26' substantially flush with the upper edges of the end walls 6' of the container. In addition, instead of the separate notches 22' the retention shoulders 30' are formed by the cut-away portions 34.

In the embodiment of Fig. 3 the off-set portions of the side walls of the handle loops or bights are omitted and the side walls 36 of the handle loops or bights 38 are continuous and substantially parallel throughout the entire height of the loops terminating at their lower ends in upwardly and outwardly inclined portions 40 which cooperate with correspondingly inclined surfaces 42 of the molded projections 43 on the end walls 44.

Where a hold-down is attached or applied to the loop 38, the hold-down stresses are imposed upon the inclined shoulders 42, and these inclined shoulders 42 at the same time prevent spreading of the side walls 36 of the loop 38 and tend to direct these side walls inwardly toward each other under these stresses. Overlying the projections 43 are a pair of corner projections 45 molded or formed integral with the container 46. The projections 45 have shoulders 47 spaced to receive the upright sides 36 of the auxiliary handle between them, and these projections 45 also form downwardly facing shoulders or ledges 48 spaced from the upwardly facing shoulders 49 of the projections 43 to receive the end portions 50 of the auxiliary handles 38 between them. The upper molded projections 45 continue longitudinally along the upper margins of the side walls 52, as indicated at 53, to form the downwardly facing side wall shoulders or ledges 54 and the molded projections 43 continue in along the adjacent end of the side wall at 55 to form the upwardly facing shoulders 56 as side continuations of the shoulders 49. The projections 55 are separated as shown, or suitably notched, to provide the vertical shoulders or lengthwise retention 58 with which the down-turned ends 59 of the inturned sides 60 of the auxiliary handles engage to hold the auxiliary handles against lengthwise displacement from the container. The ends 59 may in any embodiment be downturned or up-turned.

When the handle loops 38 are grasped, the container may be lifted by the engagement of the handle portions 50 and 60 with the downwardly facing shoulders or ledges 48 and 54. The side projections 53 are shown as extending marginally from end to end of the side walls, but it is to be understood that the downwardly facing shoulders provided thereby may be formed at the ends only of the container. In this embodiment of the invention the end projections 43, in addition to holding the auxiliary handles against downward displacement and receiving the downwardly directed stresses, may project sufficiently to form the molded handles previously referred to. In this embodiment of the invention, the auxiliary handles are applied endwise over the sides of the container, the sides 60 of the handles being spread over the shoulders or projections 55 and the downturned ends 59 hooked over the shoulders 58.

In the embodiment shown in Fig. 4, the auxiliary handles 38' are applied substantially as explained in connection with the embodiment shown in Fig. 3. In this case the side walls 36' of the handle loop or bight 38' terminates in inverted bights 65 having the sides 66 upwardly inclined or contracted for engagement with shoulders 68 formed by the molded end projections 69. The upper surfaces of the end projections 69 are spaced below the upper edge of the container to form upwardly facing shoulders 70 for cooperation with the end portions 72 of the auxiliary handles 38'.

The molded end projections 69 are shown as continuing as molded side projections 73 along the side wall of the container to form upwardly facing shoulders or ledges 74 for engagement with the inturned sides 75 of the auxiliary handles and the molded side projections 73 are shown as notched at 76 to receive the down-turned ends 77 for holding or retaining the handles against endwise displacement. It is to be understood that the projections 73 need not extend over the entire length of the side walls as shown, but may be separated to form the shoulder and retention arrangement as described. In this case, the hold-down stresses are imposed upon the upwardly facing shoulders 70 and 74 and the lifting stresses are imposed upon the shoulders 68 which, by their cooperation with the auxiliary handles, prevent spreading of the handle loops or bights.

In Figs. 6 and 7, I have shown two alternative side wall attachments. In the embodiment of Fig. 6, the side wall 80 of the battery container is shown as provided with a pair of integral or molded semi-circular and laterally projecting projections 81 over which the down-turned ends 82 of the inturned sides 83 of the auxiliary handles 84 are hooked or engaged. The in-turned sides 83 are provided with down-turned bights 85 which provide a certain yieldability for permitting the down-turned ends 82 to be sprung or hooked over the projections 81.

In the embodiment of Fig. 7 the side wall 80' of the battery container is shown as provided with a pair of molded or integral circular projections 81' over which the down-turned ends 82' at the inner ends of the side portions 83' are hooked or sprung. In this case the side portions 83' are shown as provided with up-turned bights 85' which, as before, provide a certainly yieldability for permitting the down-turned ends 82' to be hooked or sprung over the projections 81'.

In Fig. 8 I have shown the in-turned auxiliary handle sides of Fig. 6 embodied in the handle shown in Fig. 3. This is the handle shown in Fig. 6, and the reference characters employed in connection with Fig. 6 are employed in connection with Fig. 8.

It is to be understood that in connection with Fig. 4 the end projections 69 may project endwise sufficiently to form the molded handle means of the container as in the previous embodiments.

I do not intend, of course, to be limited to the precise details illustrated and described.

I claim:—

1. In combination, a container having upwardly and downwardly facing shoulder means thereon, a handle interfitting with said upwardly and downwarly facing shoulder means and held against upward and downward displacement thereby, retention means on the sides of the container, said handle having side portions embracing the sides of the container and engaged with said retention means, a bight in said handle and shoulder means on the container and engaging the sides of the bight for preventing spreading of the handle.

2. In combination, a container having side and end walls, a handle molded integrally with the end wall and projecting therefrom, downwardly and inwardly facing shoulder means on opposite sides of said molded handle and spaced therefrom, retention means on the sides of the container, and a resilient auxiliary metal bail having a handle loop, the sides of which are engageable between the sides of the molded handle and said inwardly facing shoulder means and held against spreading thereby, and side extensions on said bail turned in along the sides of the container and engaged with said retention means.

3. In combination, a container having side and end walls, a handle molded integrally with the end wall and projecting therefrom, downwardly and inwardly facing shoulder means on opposite sides of said molded handle and spaced therefrom, retention means on the sides of the container, and a resilient auxiliary metal bail having a handle loop, the sides of which are engageable between the sides of the molded handle and said inwardly facing shoulder means and held against spreading thereby, the sides of said handle loop being offset to overlie and engage the top of the molded handle and side extensions on said bail turned in along the sides of the container and engaged with said retention means.

4. In combination, a container having side and end walls, vertically and upwardly and downwardly facing abutment means on the container, and a metal bail having upright sides arranged between the vertical abutment means and held against spreading thereby, said bail having a portion engaging beneath the downwardly facing abutment means for applying the lifting stresses and having its upright sides offset to engage the upwardly facing abutment means on the container.

5. In combination, a container having side and end walls, vertically and upwardly and downwardly facing abutment means on the container, a metal bail having upright sides arranged between the vertical abutment means and held against spreading thereby, said bail having a portion engaging beneath the downwardly facing abutment means for applying the lifting stresses and having its upright sides offset to engage the upwardly facing abutment means on the container, retention means on the sides of the container, and side extensions on the bail turned in along the sides of the container and engaged with said retention means.

6. As an article of manufacture, a molded battery container having an integrally molded handle projecting centrally from one end of the container and adapted to receive and interfit with an auxiliary handle, and shoulder and retention means on the end of the container at opposite sides of the molded handle and on the sides of the container, and cooperating with said molded handle to prevent displacement of the auxiliary handle from the container.

In witness whereof, I hereunto subscribe my name this 28th day of March, A. D. 1928.

WILLIAM H. DUGGAN.